United States Patent
Ogiso

(10) Patent No.: US 6,640,756 B2
(45) Date of Patent: Nov. 4, 2003

(54) ELECTROMAGNETIC VALVE CONTROLLER OF AN INTERNAL COMBUSTION ENGINE

(75) Inventor: Makoto Ogiso, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/339,560

(22) Filed: Jan. 10, 2003

(65) Prior Publication Data

US 2003/0136361 A1 Jul. 24, 2003

(30) Foreign Application Priority Data

Jan. 21, 2002 (JP) .......................................... 2002-011846

(51) Int. Cl.⁷ .................................................. F01L 9/04
(52) U.S. Cl. .................................. 123/90.11; 123/90.24; 123/179.3
(58) Field of Search ......................... 123/90.11, 90.24, 123/179.3, 198 F

(56) References Cited

U.S. PATENT DOCUMENTS 5,596,956 A * 1/1997 Ogawa et al. ............ 123/90.11
6,202,608 B1   3/2001 Yamaki et al. ............ 123/90.11
6,343,577 B2 * 2/2002 Toriumi .................... 123/90.11

FOREIGN PATENT DOCUMENTS

JP           A 10-18820        1/1998 ............. F01L/9/04

* cited by examiner

Primary Examiner—Thomas Denion
Assistant Examiner—Kyle Riddle
(74) Attorney, Agent, or Firm—Oliff & Berridge, PLC

(57) ABSTRACT

A electromagnetic valve controller for an internal combustion engine selectively implements a normal operation mode for controlling all of the electromagnetic valves according to normal principles for implementing a four-cycle operation of the internal combustion engine, and a valve-stopped operation mode for controlling the electromagnetic valves according to rules for stopping at least one of the electromagnetic valves. In other words, execution of the valve-stopped operation mode is inhibited for a predetermined period after the internal combustion engine is started. Therefore, a failure of any one of the electromagnetic valves caused by the valve-stopped operation can be appropriately prevented from occurring, without degrading starting response characteristics of the internal combustion engine.

14 Claims, 9 Drawing Sheets

ELECTROMAGNETIC VALVE CONTROLLER OF AN INTERNAL COMBUSTION ENGINE

INCORPORATION BY REFERENCE

The disclosure of Japanese Patent Application No. 2002-011846 filed on Jan. 21, 2002 including the specification, drawings and abstract is incorporated herein by reference in its entirety.

BACKGROUND OF THE INVENTION

1. Field of Invention

The invention relates to an electromagnetic valve controller for controlling electromagnetic valves each functioning as an intake valve or an exhaust valve of an internal combustion engine.

2. Description of Related Art

An internal combustion engine in which intake valves and exhaust valves are each formed by an electromagnetic valve is known in the art. Such an internal combustion engine is disclosed in, e.g., Japanese Patent Laid-Open Publication No. 2000-257481. In such an internal combustion engine, intake valves and exhaust valves can be driven with greater flexibility as compared to an internal combustion engine in which intake valves and exhaust valves are driven by a cam mechanism. Therefore, an internal combustion engine having electromagnetic valves is capable of implementing operations such as a single-valve operation, a reduced-cylinder operation, and a six-strokes per cycle operation (hereinafter, referred to as "six-cycle operation"). The single-valve operation is operation in which one of two intake valves provided in each cylinder is stopped. The reduced-cylinder operation is operation in which at least one of the cylinders is stopped. The six-cycle operation is operation in which the four strokes conducted in four-strokes per cycle operation (hereinafter, referred to as "four-cycle operation") are conducted in six strokes of the piston. If the single-valve operation, the reduced-cylinder operation, the six-cycle operation, and the like (hereinafter, these operations are collectively referred to as "valve-stopped operation") are conducted under appropriate conditions, fuel consumption of the internal combustion engine can be improved. Therefore, internal combustion engines of this type having electromagnetic valves may exhibit excellent fuel consumption characteristics as compared to a commonly used internal combustion engine which activates the intake valves and the exhaust valves by a cam mechanism.

While valve-stopped operation is conducted in the internal combustion engine having electromagnetic valves, lubricating oil may disadvantageously accumulate within the stopped electromagnetic valve. If the internal combustion engine is stopped in this state, the electromagnetic valve which is in the stopped state when the internal combustion engine is stopped may operate less smoothly than the electromagnetic valve which is in the operating state when the internal combustion engine is stopped.

If the internal combustion engine is restarted in such a state and a request such as an acceleration request is generated while the internal combustion engine is being held in such a state, a failure such as step-out is likely to occur in the electromagnetic valve that operates less smoothly. Therefore, if valve-stopped operation is conducted in internal combustion engines of this type having electromagnetic valves, it is desirable if a state in which all of the electromagnetic valves can operate smoothly is established immediately after the internal combustion engine is started.

One function of the above conventional internal combustion engine is to conduct initial suction of all of the electromagnetic valves and then start the starter when a request to start the internal combustion engine is generated. This function is directly intended to disperse the power required for the initial suction of the electromagnetic valves and the power required to drive the starter. However, the above function enables all of the electromagnetic valves to be operated before the internal combustion engine is started. In other words, even if there is an electromagnetic valve which operates less smoothly upon starting of the internal combustion engine, such an electromagnetic valve is operated before the starter is started. Therefore, this internal combustion engine can improve operation characteristics of the electromagnetic valves even if there is an electromagnetic valve which operates less smoothly upon starting of the internal combustion engine. In this respect, the above conventional internal combustion engine is expected to demonstrate a degree of effectiveness in preventing a failure of an electromagnetic valve caused by execution of valve-stopped operation.

As described above, however, the above conventional internal combustion engine conducts initial suction of all of the electromagnetic valves before starting the starter. More specifically, the above conventional internal combustion engine is not started until initial suction of all of the electromagnetic valves is completed after a request to start the internal combustion engine is generated by a driver of a vehicle. In other words, the time required to start the internal combustion engine is long enough to cause displeasure for the driver. Therefore, the control method used in the above conventional internal combustion engine is not always appropriate as a method for preventing a failure caused by the execution of valve-stopped operation.

SUMMARY OF THE INVENTION

The invention is intended to solve the above problems, and it is an object of the invention to provide an electromagnetic valve controller capable of appropriately preventing a failure of an electromagnetic valve due to execution of valve-stopped operation, without degrading starting response characteristics of an internal combustion engine.

In order to achieve the above object, according to an aspect of the invention, a controller of a plurality of electromagnetic valves each functioning as an intake valve or an exhaust valve of an internal combustion engine, comprising a valve control portion that controls the electromagnetic valves in one of a normal operation mode and a valve-stopped operation mode, the normal operation mode being a mode in which all of the electromagnetic valves are controlled in order to implement the four-cycle operation of the internal combustion engine, and the valve-stopped operation mode being a mode in which at least one of the electromagnetic valves can be regarded as being stopped as compared to the normal operation mode, wherein the valve control portion inhibits control in the valve-stopped operation mode for a predetermined period after the internal combustion engine is started.

The invention having the above structure provides the following effects. Control in the valve-stopped operation mode is inhibited for the predetermined period after the internal combustion engine is started. Therefore, all of the electromagnetic valves can be operated during the predetermined period. As a result, according to the invention, it is possible to render all of the electromagnetic valves into a state where they can operate smoothly during this predetermined period, without degrading starting response characteristics of the internal combustion engine.

DETAILED DESCRIPTION OF THE PREFERRED EMBODIMENTS

Figure 1:
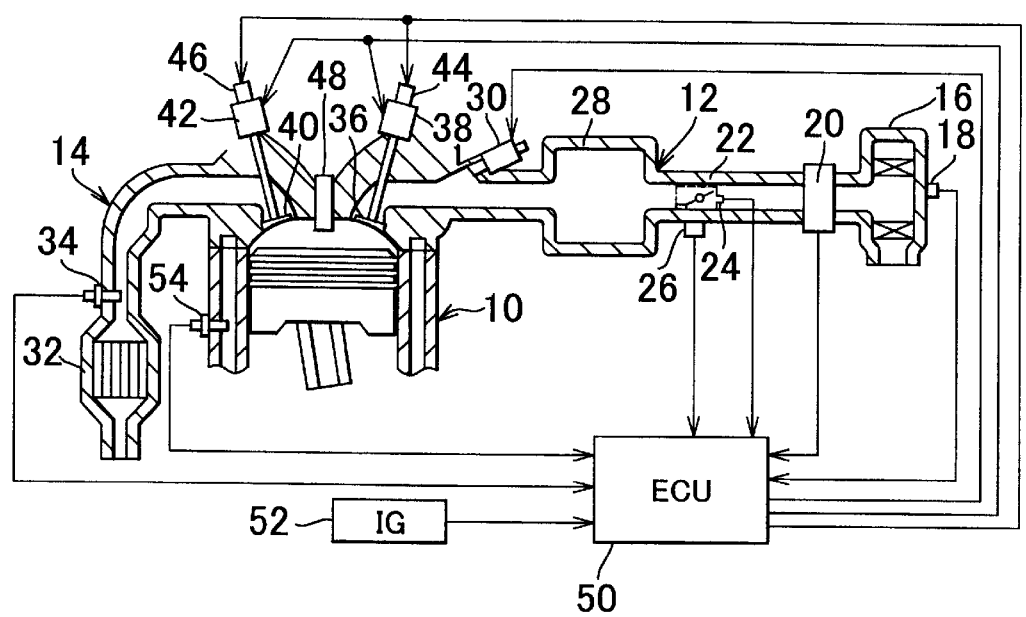
FIG. 1 illustrates the structure of a first embodiment of the invention.

Hereinafter, embodiments of the invention will be described with reference to the accompanying drawings. It should be noted that common elements are denoted with the same reference numerals throughout the figures, and description thereof will not be repeated.

First Embodiment

FIG. 1 shows the structure of the first embodiment of the invention. The structure of FIG. 1 includes an internal combustion engine 10. An intake passage 12 and an exhaust passage 14 communicate with the internal combustion engine 10. The intake passage 12 has an air filter 16 at an upstream end thereof. An intake air temperature sensor 18 is attached to the air filter 16.

An air flow meter 20 is provided downstream of the air filter 16. The air flow meter 20 is a sensor for detecting the intake air amount Ga flowing through the intake passage 12. A throttle valve 22 is provided downstream of the air flow meter 20. The throttle valve 22 may either be a mechanical throttle valve for implementing a throttle opening according to an accelerator opening, or an electronic throttle valve capable of controlling a throttle opening independently of an accelerator opening. A throttle sensor 24 for detecting a throttle opening TA is provided near the throttle valve 22.

A surge tank 28 is provided downstream of the throttle valve 22. Fuel injection valves 30 are provided downstream of the surge tank 28. Each fuel injection valve 30 injects fuel to a corresponding intake port of the internal combustion engine 10. A catalyst 32 communicates with the exhaust passage 14. An exhaust $O_2$ sensor 34 is provided upstream of the catalyst 32.

The internal combustion engine 10 includes electromagnetic intake valves 38 and electromagnetic exhaust valves 42. Each electromagnetic intake valve 38 electromagnetically drives a corresponding intake valve 36, and each electromagnetic exhaust valve 42 electromagnetically drives a corresponding exhaust valve 40. A lift sensor 44 for detecting a lift amount of the intake valve 36 is attached to each electromagnetic intake valve 38. Similarly, a lift sensor 46 for detecting the lift amount of the exhaust valve 40 is attached to each electromagnetic exhaust valve 42.

The internal combustion engine 10 is a multi-cylinder engine (although not shown in the figures, the internal combustion engine 10 of the present embodiment is a four-cylinder engine having cylinders 1, 2, 3 and 4). A plurality of intake valves 36 and a plurality of exhaust valves 40 are provided for each cylinder. For convenience, it is herein assumed that two of the electromagnetic intake valves 38 and two of the electromagnetic exhaust valves 40 are provided for each of the four cylinders of the internal combustion engine 10. A spark plug 48 is also provided for each cylinder. Each spark plug 48 has its tip exposed within a corresponding cylinder.

Each electromagnetic intake valve 38 is capable, in the absence of current application, of maintaining a corresponding intake valve 36 at a neutral position, i.e., a half-open position, and capable of moving the intake valve 36 to one of a fully opened position and a fully close position in response to an external drive signal. Similarly, each electromagnetic exhaust valve 42 is capable, in the absence of current application, of maintaining a corresponding exhaust valve 40 at the neutral position and capable of moving the exhaust valve 40 to one of the fully opened position and the fully closed position in response to an external drive signal.

A hydraulic pump, not-shown, supplies lubricating oil to the electromagnetic intake valves 38 and the electromagnetic exhaust valves 42. A wet-type sliding bearing for holding the valve stem of the intake valve 36 or the exhaust valve 40 is incorporated in each of the electromagnetic intake valves 38 and the electromagnetic exhaust valves 42. The lubricating oil supplied from the hydraulic pump is supplied to the sliding bearing within the electromagnetic intake valves 38 and the electromagnetic exhaust valves 42.

As shown in FIG. 1, the system of the present embodiment includes an ECU (Electronic Control Unit) 50. In addition to the sensors described above, an ignition switch (IG switch) 52 and a water temperature sensor 54 are connected to the ECU 50. The ECU 50 controls the fuel injection valves 30, the electromagnetic intake valves 38, the electromagnetic exhaust valves 42, and the like. The spark plugs 48 conduct ignition operation at a timing determined by the ECU 50.

Hereinafter, the operation of the system of the present embodiment will be described with reference to FIGS. 2 to 7.

One function of the internal combustion engine 10 of the present embodiment is switching the operation mode between a normal operation mode and a valve-stopped operation mode according to the operation condition. The normal operation herein means four-strokes per cycle operation (the four-cycle operation) in which four strokes (one cycle), i.e., intake stroke, compression stroke, expansion stroke and exhaust stroke, are conducted in each cylinder during every four strokes of the piston (i.e., every time the crank angle changes by 720 degrees). The valve-stopped operation herein means the single-valve operation, the reduced-cylinder operation, the six-strokes per cycle operation (the six-cycle operation), and the like. The single-valve operation herein refers to operation in which one of the two intake valves 36 (or one of the two exhaust valves 40) in each cylinder is stopped. The reduced-cylinder operation herein refers to operation in which at least one of the cylinders is stopped. The six-cycle operation refers to operation in which one cycle described above is conducted during every six strokes (four strokes and two extra strokes) of the piston (i.e., every time the crank angle changes by 1,080 degrees).

Figure 2:
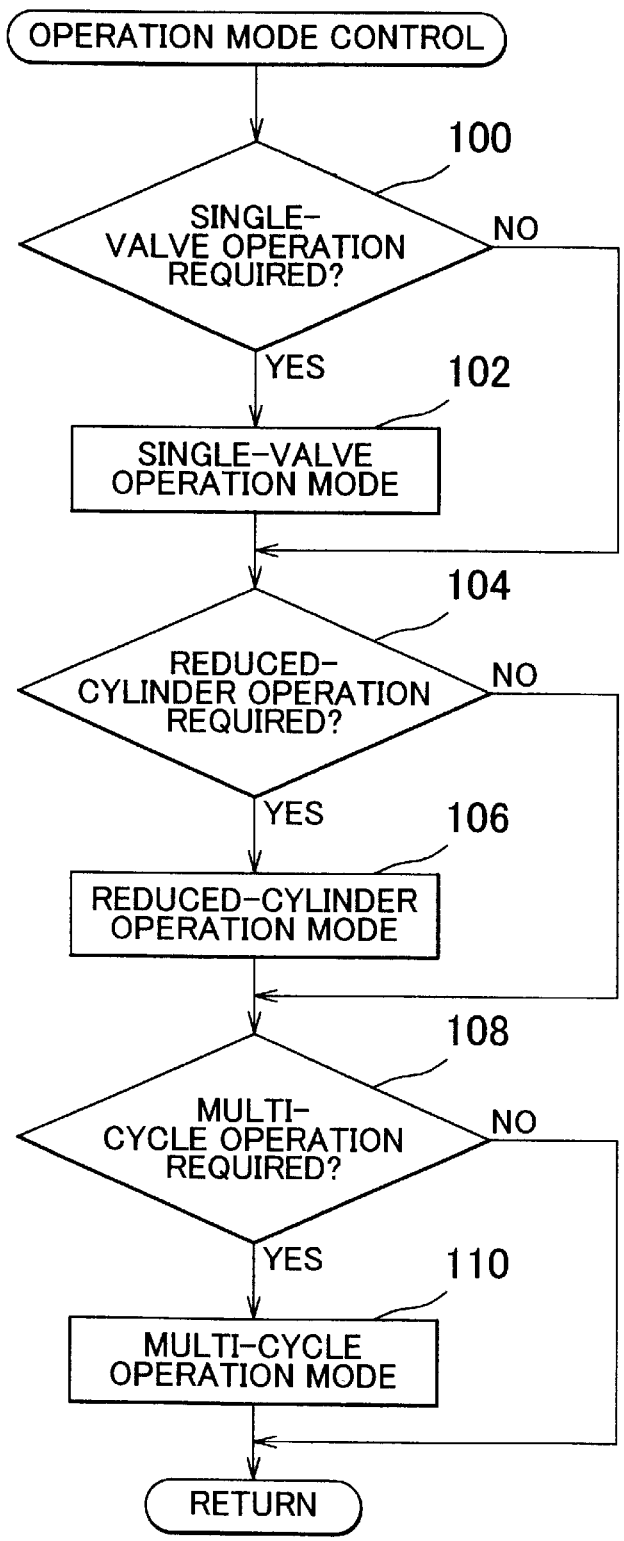
FIG. 2 is a flowchart of an operation mode control routine which is executed in the first embodiment.

FIG. 2 is a flowchart of a control routine which is executed by the ECU 50 in order to implement the valve-stopped operation mode according to the operation condition.

In the routine of FIG. 2, it is determined whether or not the operation condition of the internal combustion engine 10 requires the single-valve operation (step 100).

If it is determined in step 100 that the single-valve operation is required, a command to enter the single-valve operation mode is generated (step 102).

In this case, operation in each cylinder is continued in the single-valve operation mode in which only one of the two intake valves 36 (or one of the two exhaust valves 40) is opened and closed. On the other hand, if it is determined in step 100 that the single-valve operation is not required, step 102 is skipped, and operation is continued using all intake valves 36 (or all exhaust valves 40).

In the routine of FIG. 2, it is then determined whether or not the operation condition of the internal combustion engine 10 requires the reduced-cylinder operation (step 104).

If it is determined in step 104 that the reduced-cylinder operation is required, a command to enter a reduced-cylinder operation mode is generated (step 106).

In this case, for example, cylinders 1 and 4 are stopped and only operation of cylinders 2 and 3 is conducted. On the other hand, if it is determined in step 104 that the reduced-cylinder operation is not required, step 106 is skipped, and operation is continued using all cylinders.

In the routine of FIG. 2, it is then determined whether or not the operation condition of the internal combustion engine 10 requires multi-cycle operation, or, more specifically, the six-cycle operation (step 108).

If it is determined in step 108 that the six-cycle operation is required, a command to enter the six-cycle operation mode is generated (step 110).

In this case, the six-cycle operation, namely, the operation in which intake, compression, expansion and exhaust strokes are repeated every time the crank angle changes by 1,080 degrees, is conducted. On the other hand, if it is determined in step 108 that the six-cycle operation is not required, the four-cycle operation, namely, the operation in which the above four strokes are repeated every time the crank angle changes by 720 degrees, is continued.

As described above, the system of the present embodiment conducts appropriate valve-stopped operation according to the operation condition of the internal combustion engine 10. Therefore, the system of the present embodiment enables improvement in fuel consumption characteristics of the internal combustion engine 10, in comparison to the case where normal operation (i.e., operation in which all electromagnetic valves and all cylinders are operated in the four-cycle operation) is conducted all the time.

In the system of the present embodiment, lubricating oil may be accumulated in an inappropriate portion of the electromagnetic valve 38, 42 which is stopped during operation of the internal combustion engine 10. If the internal combustion engine 10 is stopped in this state, the electromagnetic valve 38, 42 in such a condition may not be able to operate smoothly upon restart of the internal combustion engine 10.

If the valve-stopped operation is permitted right after the internal combustion engine 10 is started, the internal combustion engine 10 may start operating before the given electromagnetic valve 38, 42 is restored to the state in which it can operate smoothly. In this case, large output is required of the internal combustion engine 10, and the electromagnetic valves 38, 42 must operate as soon as the operation mode of the internal combustion engine 10 is switched from the valve-stopped operation mode to the normal operation mode.

In the case where the operation mode of the internal combustion engine 10 is switched from the valve-stopped operation mode to the normal operation mode, the electromagnetic valves 38, 42 are commonly required to operate at a high speed. If the electromagnetic valve 38, 42 which cannot operate smoothly is required to conduct such high-speed operation, the electromagnetic valve 38, 42 is likely to suffer from a failure such as step-out. Therefore, in the system of the present embodiment, it is desirable that a state in which all of the electromagnetic valves 38, 42 can operate smoothly be established before high-speed operation is required of the electromagnetic valves 38, 42, after the internal combustion engine 10 is started.

Figure 3:
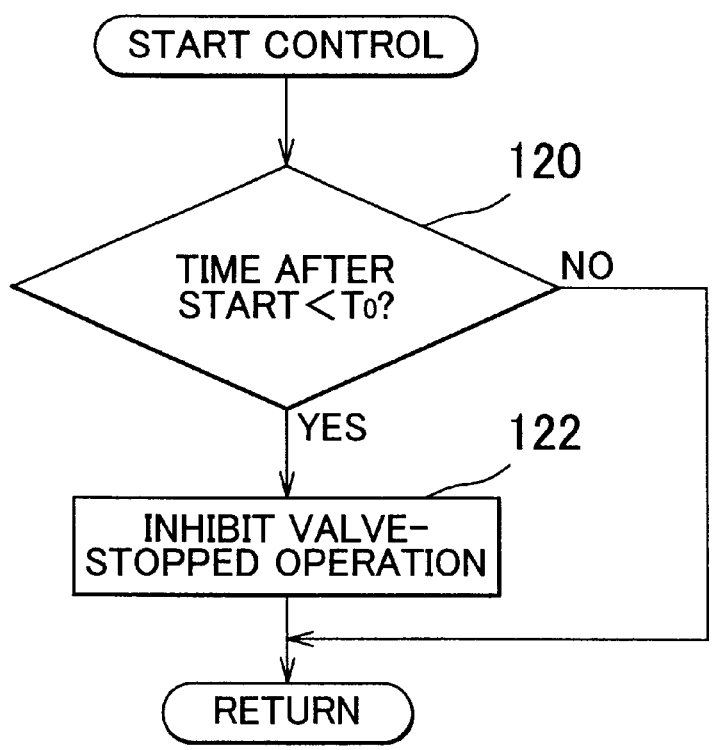
FIG. 3 is a flowchart of a start control routine which is executed in the first embodiment.

FIG. 3 is a flowchart of a start control routine which is executed by the ECU 50 in order to implement the above function.

In the routine of FIG. 3, it is determined whether or not the time which has elapsed after starting of the internal combustion engine 10 is shorter than a predetermined time $T_0$. More specifically, it is determined whether or not the time which has elapsed after the ignition switch (IG switch) of the internal combustion engine 10 was turned ON and the starter was started is shorter than the predetermined time $T_0$ (step 120).

It should be noted that, the time which has elapsed after starting of the internal combustion engine 10 may alternatively be the time which has elapsed after it was determined that the start of the internal combustion engine 10 was completed, that is, the time which has elapsed after it was determined that perfect ignition was completed.

If it is determined in step 120 that the time which has elapsed after starting of the internal combustion engine 10 is shorter than $T_0$, the valve-stopped operation is inhibited (step 122).

If step 122 is conducted, the valve-stopped operation is inhibited even if it is requested in the routine of FIG. 2. The internal combustion engine 10 continues to operate in the normal operation mode, that is, the operation mode in which all electromagnetic valves and all cylinders are operated in the four-cycle operation.

On the other hand, if it is determined in step 120 that the time which has elapsed after the start of the internal combustion engine 10 is equal to or longer than $T_0$, step 122 is skipped. In this case, if the valve-stopped operation is requested in the routine of FIG. 2, execution of the single-valve operation mode, the reduced-valve operation mode or the multi-cycle operation mode is permitted according to the request.

As described above, according to the routine of FIG. 3, the valve-stopped operation can be inhibited, that is, each electromagnetic valve 38, 42 can be operated in the normal operation mode, at least for the predetermined time $T_0$ after the internal combustion engine 10 is started. The predetermined time $T_0$ is experimentally or empirically determined as the time during which the valve-opening operation and the valve-closing operation can be repeated the number of times which is necessary to allow the electromagnetic valve 38, 42 which cannot operate smoothly to be restored to a state in which it can operate smoothly (the time during which each of the valve-opening operation and the valve-closing operation can be conducted at least once).

When the internal combustion engine 10 is started, there may be an electromagnetic valve 38, 42 which cannot operate smoothly due to the valve-stopped operation. According to the system of the present embodiment, however, such an electromagnetic valve 38, 42 can be quickly restored to the state in which it can operate smoothly during the period right after the internal combustion engine 10 is started, i.e., the period in which the internal combustion engine 10 is considered to be in an idle state. According to the system of the present embodiment, the valve-stopped operation can be appropriately conducted according to the operation condition of the internal combustion engine 10, while effectively preventing a failure of the electromagnetic intake valves 38 and the electromagnetic exhaust valves 42 from being caused by the valve-stopped operation.

As has been described above, in the present embodiment, each electromagnetic valve 38, 42 is operated for the predetermined time $T_0$ after the internal combustion engine 10 is started. One function of the system of the present embodiment is completing calibration of the lift sensors 44, 46 for all of the electromagnetic valves 38, 42 during the predetermined time $T_0$.

Figure 4:
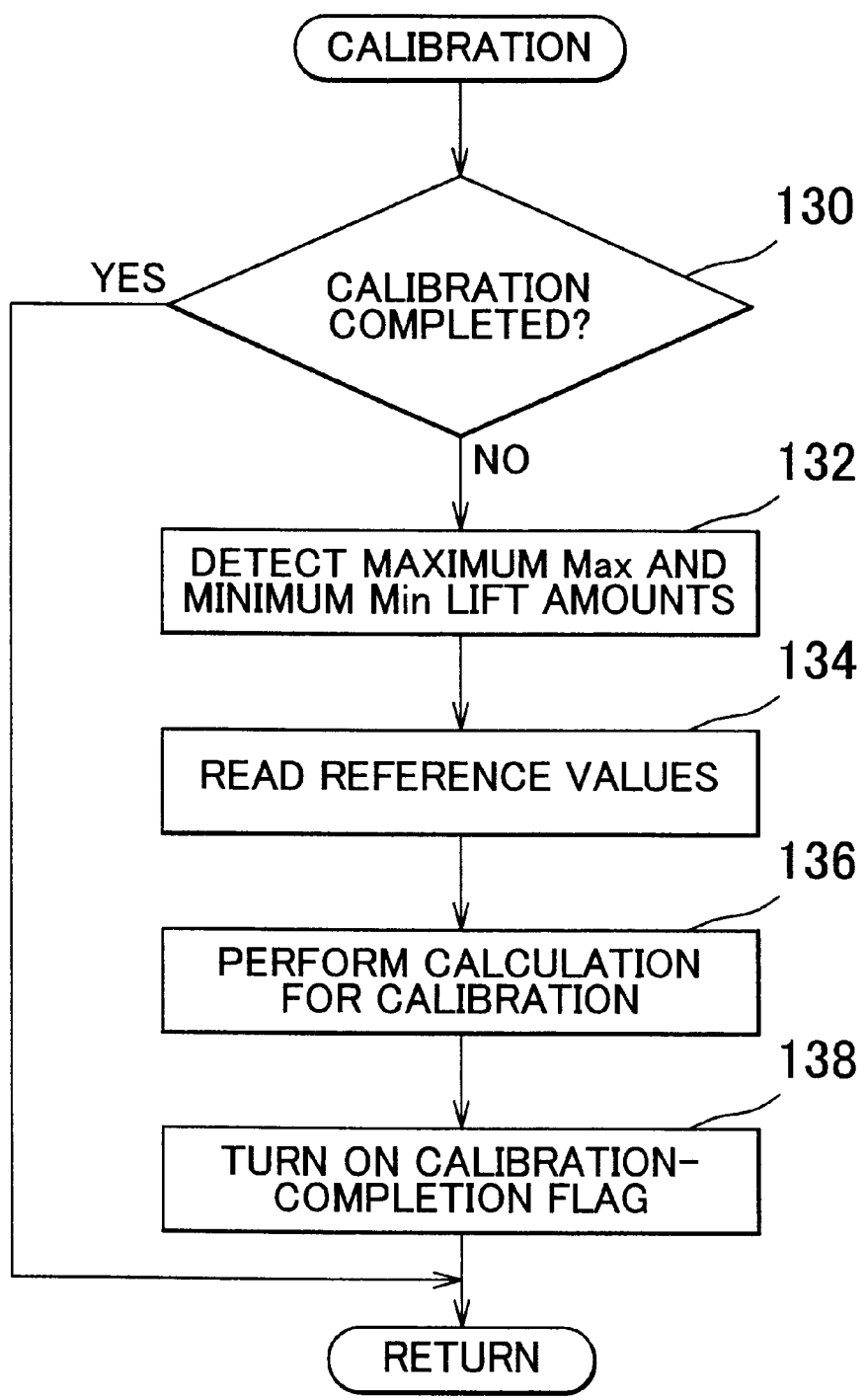
FIG. 4 is a flowchart of a calibration routine which is executed in the first embodiment.

FIG. 4 is a flowchart of a control routine which is executed by the ECU 50 in order to implement the above function. This routine is independently executed for each electromagnetic valve 38, 42 after the internal combustion engine 10 is started. Accordingly, in the system of the present embodiment, the routine of FIG. 4 is executed four times in each cylinder. More specifically, the routine of FIG. 4 is executed twice for the two electromagnetic intake valves 38 and twice for the two electromagnetic exhaust valves 42 in each cylinder. The routine of FIG. 4 may either be executed simultaneously or sequentially for the four electromagnetic valves 38, 42 depending on the specification of the ECU 50.

In the routine of FIG. 4, it is determined after the internal combustion engine 10 is started whether or not calibration has been completed for the given electromagnetic valve 38 or 42 (step 130).

If it is determined in step 130 that calibration has been completed, there is no benefit to be attained from proceeding with the routine of FIG. 4. Therefore, this cycle of the routine is immediately terminated.

On the other hand, if it is determined in step 130 that calibration has not been completed, the maximum value Max and the minimum value Min of the lift amount of one of the intake valve 36 and the exhaust valve 40 are detected. More specifically, the value which is output from he lift sensor 44 or 46 while the intake valve 36 or the exhaust valve 40 is held in the fully opened position and the value which is output from the lift sensor 44 or 46 while the intake valve 36 or the exhaust valve 40 is held in the fully closed position are detected as the maximum value Max and the minimum value Min of the lift amount, respectively (step 132).

Reference values used for calibration are then read out (step 134).

As will be described below, the ECU 50 stores the maximum value Max and the minimum value Min, which are output from the lift sensor 44, 46 after the internal combustion engine 10 has warmed up sufficiently, as characteristic values of the lift sensor 44, 46. In step 134, these values are read out as the reference values.

The detected maximum value Max and minimum value Min are then compared with the reference values, whereby calculation for calibration is performed so as to compensate for the errors that have built up in the output of the lift sensor 44 or 46 (step 136).

More specifically, a correction coefficient for calculating the actual lift amount from the output of the lift sensor 44 or 46 is calculated. By using this correction coefficient, the ECU 50 detects the lift amount of the intake valve 36 or the exhaust valve 40 based on the output of one of the lift sensor 44 and 46.

In the routine of FIG. 4, an appropriate flag is turned ON in order to indicate that calibration has been completed for the given electromagnetic valve 38 or (step 138).

If step 138 is conducted, the condition of step 130 is satisfied. Therefore, steps 132 to 138 are skipped the next time the routine of FIG. 4 is started.

As described above, the routine of FIG. 4 is executed for every electromagnetic valve 38, 42 after the internal combustion engine 10 is started. Calibration of this routine can be completed by driving the electromagnetic valve 38, 42 to the fully opened position once and then driving the electromagnetic valve 38, 42 to the fully closed position once. Accordingly, calibration can be completed during the predetermined time $T_0$ during which the valve-stopped operation is inhibited. Therefore, according to the system of the present embodiment, each electromagnetic valve 38, 42 can be rendered into a state in which it can operate smoothly right after the internal combustion engine 10 is started. Moreover, calibration of the lift sensors 44, 46 of all of the electromagnetic valves 38, 42 can be completed right after the internal combustion engine 10 is started.

Hereinafter, the process which is conducted by the system of the present embodiment in order to prevent a failure of the electromagnetic valves 38, 42 from being caused by the valve-stopped operation will be described. This process is conducted when the internal combustion engine 10 is stopped.

As described above, in the present embodiment, at least one of the electromagnetic valves 38, 42 cannot operate smoothly upon starting of the internal combustion engine 10 if the internal combustion engine 10 is stopped with this electromagnetic valve 38, 42 being stopped. More specifically, the electromagnetic valve 38, 42 cannot operate smoothly when the internal combustion engine 10 is started, if the internal combustion engine 10 is stopped with lubricating oil accumulated in an inappropriate portion of the electromagnetic valve 38, 42. Such a problem can be effectively prevented by the following method: if a request to stop the internal combustion engine 10 is generated, all the electromagnetic valves 38, 42 are operated and then stopped.

Figure 5:
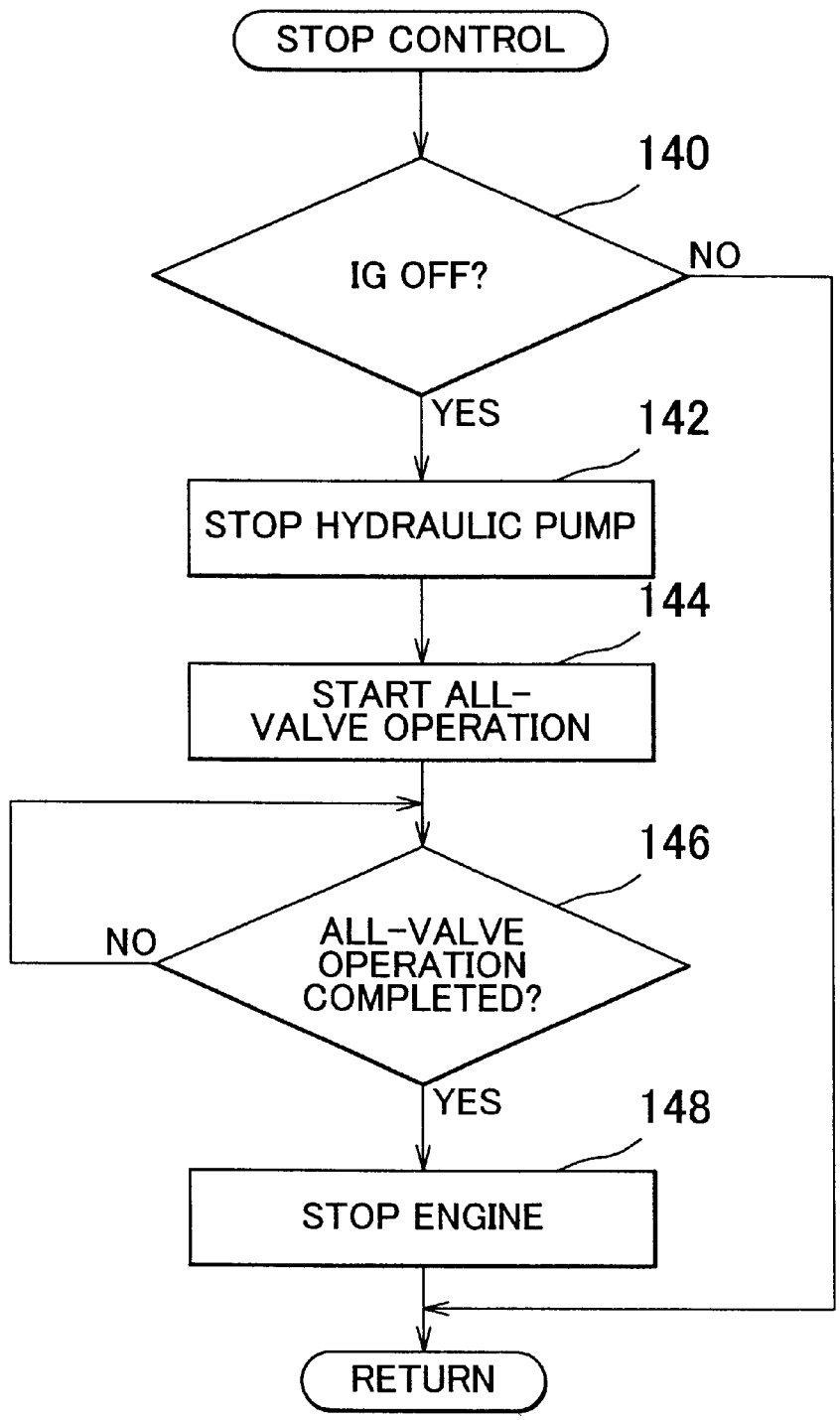
FIG. 5 is a flowchart of a stop control routine which is executed in the first embodiment.

FIG. 5 is a flowchart of a stop control routine which is executed by the ECU 50 in order to implement the above function.

In the routine of FIG. 5, it is determined whether or not the IG switch 52 has been turned OFF, that is, whether or not a request to stop the internal combustion engine 10 has been generated (step 140).

If it is determined in step 140 that the IG switch 52 has not been turned OFF, this cycle of the routine is terminated without executing the following steps. On the other hand, if it is determined in step 140 that the IG switch 52 has been turned OFF, the hydraulic pump supplying lubricating oil to the electromagnetic valves 38, 42 is stopped (step 142).

After the hydraulic pump is stopped, the operation of opening and closing all of the electromagnetic valves 38, 42 a predetermined number of times (hereinafter, referred to as "all-valve operation") is started (step 144).

In the system of this embodiment, fuel injection and ignition are terminated as soon as the IG switch 52 is turned OFF. Therefore, the all-valve operation is conducted in a condition where combustion does not occur in the cylinders. In this case, the intake valves 36 and the exhaust valves 40 are not necessarily opened and closed according to the principles of the four-cycle operation. In the all-valve operation of this embodiment, the intake valves 36 and the exhaust valves 40 are operated according to the principles of two-strokes per cycle operation (hereinafter, referred to as "two-cycle operation"), such that the intake stroke and the exhaust stroke are repeated every time the crank angle changes by 180 degrees.

Next, in the routine of FIG. 5, it is determined whether or not the all-valve operation has been completed (step 146).

If all of the electromagnetic valves 38, 42 have been opened and closed the predetermined number of times, it is determined in step 146 that the all-valve operation has been completed. In the routine of FIG. 5, the internal combustion engine 10 is completely stopped (including the state where all of the electromagnetic valves 38, 42 are stopped) after it is determined in step 146 that the all-valve operation has been completed (step 148).

As described above, in the routine of FIG. 5, after the IG switch 52 is turned OFF and the hydraulic pump is stopped, all of the electromagnetic valves 38, 42 can be opened and closed the predetermined number of times. As a result, during this operation, lubricating oil accumulated in the electromagnetic valve 38, 42 which is in the stopped state when the IG switch 52 is turned OFF is discharged. Accordingly, this electromagnetic valve 38, 42 is completely stopped in approximately the same state as that of the electromagnetic valves 38, 42 which have been operated before the IG switch 52 is turned OFF. According to the system of this embodiment, the above problem, namely, the problem that at least one of the electromagnetic valves 38, 42 cannot operate smoothly, can be effectively prevented from occurring upon restart of the internal combustion engine 10.

Hereinafter, learning control which is conducted by the system of this embodiment during the all-valve operation will be described.

In the present embodiment, the ECU 50 controls operation characteristics (such as moving speed and timing) of the intake valves 36 and the exhaust valves 40 by a driving current which is supplied to the electromagnetic intake valves 38 or the electromagnetic exhaust valves 42. In addition, a function of the ECU 50 is comparing the actual operation characteristics of the intake valves 36 and the exhaust valves 40 with the ideal operation characteristics and learning the profile of the driving current which is supplied to the electromagnetic intake valves 38 and the electromagnetic exhaust valves 42, so that the actual operation characteristics become closer to the ideal operation characteristics.

The operation characteristics of the intake valves 36 and the exhaust valves 40 are affected by the profile of the driving current which is supplied to the electromagnetic intake valves 38 and the electromagnetic exhaust valves 42, and furthermore, are affected even more by the pressure in the cylinder during operation of the intake valves 36 and the exhaust valves 40. Therefore, during the normal operation in which combustion is conducted in the cylinder, it is difficult to learn the driving-current profile for realizing the ideal operation characteristics from the actual operation characteristics of the intake valves 36 and the exhaust valves 40.

In this embodiment, during the all-valve operation, the intake valves 36 and the exhaust valves 40 are repeatedly opened and closed in a state in which combustion is not conducted in the cylinder. In this case, the intake valves 36 and the exhaust valves 40 can operate without being affected by the combustion pressure. Accordingly, if the profile of the driving current which is supplied to the electromagnetic intake valves 38 and the profile of the driving current which is supplied to the electromagnetic exhaust valves 42 are learned during the all-valve operation, the profiles can be learned with a high degree of accuracy, without being affected by variation in combustion pressure.

Figure 6:
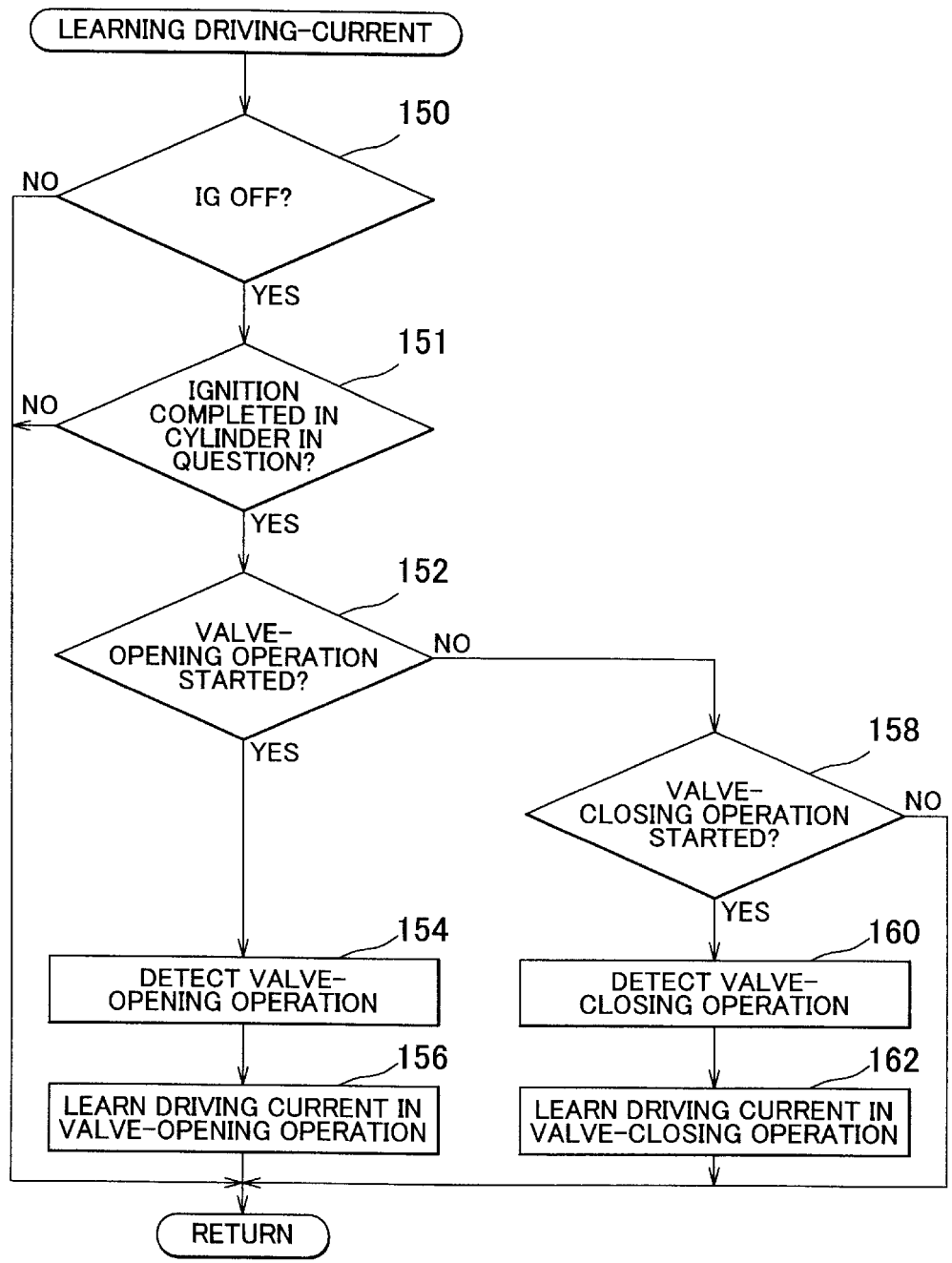
FIG. 6 is a flowchart of a driving-current learning routine which is executed in the first embodiment.

FIG. 6 is a flowchart of a driving-current learning routine which is executed by the ECU 50 in order to implement the above function. Like the routine of FIG. 4, this routine is independently executed for each electromagnetic valve 38, 42. Accordingly, the routine of FIG. 6 is executed four times in each cylinder.

More specifically, the routine of FIG. 6 is executed twice for the two electromagnetic intake valves 38 and twice for the two electromagnetic exhaust valves 42 in each cylinder. This routine may either be conducted simultaneously or sequentially for the four electromagnetic valves 38, 42 in each cylinder, depending on the processing capability of the ECU 50.

The all-valve operation is conducted according to the principles of the two-cycle operation. Therefore, the electromagnetic valves 38, 42 of cylinder 1 operate with the same timing as that of the electromagnetic valves 38, 42 of cylinder 4. Accordingly, one of two routines for the electromagnetic intake valves 38 of cylinders 1 and 4 (i.e., the routine for the electromagnetic intake valves 38 of cylinder 1 and the routine for the electromagnetic intake valves 38 of cylinder 4) and two routines for the electromagnetic exhaust valves 42 of cylinders 1 and 4 may be executed simultaneously. Similarly, one of two routines for the electromagnetic intake valves 38 of cylinders 2 and 3 and two routines for the electromagnetic exhaust valves 42 of cylinders 2 and 3 may be executed simultaneously. Accordingly, a plurality of routines may be simultaneously executed if it is possible given the processing capability of the ECU 50.

Furthermore, the routine of FIG. 6 may be sequentially executed for all of the electromagnetic valves 38, 42. In this case, the load on the ECU 50 can be reduced as compared to the case where the driving currents for a plurality of electromagnetic valves 38, 42 are learned simultaneously, and the stability of the ECU 50 can be improved.

In the routine of FIG. 6, it is determined whether or not the IG switch 52 has been turned OFF (step 150).

If it is determined in step 150 that the IG switch 52 has not been turned OFF, this cycle of the routine is immediately terminated. On the other hand, if it is determined in step 150 that the IG switch 52 has been turned OFF, it is then determined whether or not the final ignition has been completed in the cylinder of the given electromagnetic valve 38 or 42 (step 151).

Depending on the timing at which the IG switch 52 is turned OFF, ignition in each cylinder may be conducted after the IG switch 52 is turned OFF. Ignition conducted after the IG switch 52 is turned OFF is also included in the determination of step 151.

If it is determined in step 151 that final ignition has not been completed, this cycle of the routine is immediately terminated. On the other hand, if it is determined in step 151 that final ignition has been completed, it is then determined whether or not the given electromagnetic valve 38 or 42 has started the valve-opening operation (step 152).

If it is determined in step 152 that the given electromagnetic valve 38 or 42 has started the valve-opening operation, the process of detecting the valve-opening operation is conducted (step 154).

More specifically, an actual profile from the fully closed position to the fully opened position of the intake valve 36 or the exhaust valve 40 driven by the given electromagnetic valve 38 or 42 is determined in step 154.

The valve-opening operation detected in step 154 is then compared with the ideal valve-opening operation pre-stored in the ECU 50. The profile of the driving current in the valve-opening operation is learned, based on this comparison result. More specifically, the profile of the driving current which is supplied during the valve-opening operation to the given electromagnetic valve 38 or 42, is corrected so that the profile obtained in step 154 becomes closer to an ideal profile (step 156).

In the routine of FIG. 6, if it is determined in step 152 that the given electromagnetic valve 38 or 42 has not started the valve-opening operation, it is then determined whether or not this electromagnetic valve 38 or 42 has started valve-closing operation (step 158).

If it is determined in step 158 that this electromagnetic valve 38 or 42 has started the valve-closing operation, the process of detecting the valve-closing operation is conducted (step 160).

More specifically, an actual profile from the fully opened position to the fully closed position of the intake valve 36 or the exhaust valve 40 driven by this electromagnetic valve 38 or 42 is determined in step 160.

The valve-closing operation detected in step 160 is then compared with the ideal valve-closing operation pre-stored in the ECU 50. The profile of the driving current in the valve-closing operation is learned, based on the comparison result. More specifically, the profile of the driving current which is supplied to the given electromagnetic valve 38 or 42 in the valve-closing operation is corrected so that the profile obtained in step 160 becomes closer to an ideal profile (step 162).

As has been described above, according to the routine of FIG. 6, the learning operation for making the valve-opening operation and the valve-closing operation of the electromagnetic valves 38, 42 closer to the respective ideal profiles can be conducted while all of the electromagnetic valves 38, 42 are driven in the all-valve operation, that is, while all of the electromagnetic valves 38, 42 operate without being affected by the combustion pressure, after the IG switch 52 is turned OFF and the final ignition is completed in each cylinder. Therefore, the system of the embodiment can accurately learn a driving current for realizing ideal operation characteristics of all of the electromagnetic valves 38, 42.

As described with reference to FIG. 4, the system of the present embodiment conducts calibration of the lift sensors 44, 46 of all of the electromagnetic valves 38, 42 during the period in which the valve-stopped operation is inhibited after the internal combustion engine 10 is started. This calibration is conducted by comparing the reference values stored in the ECU 50 with the actually detected maximum value Max and minimum value Min of the lift amount.

Figure 7:
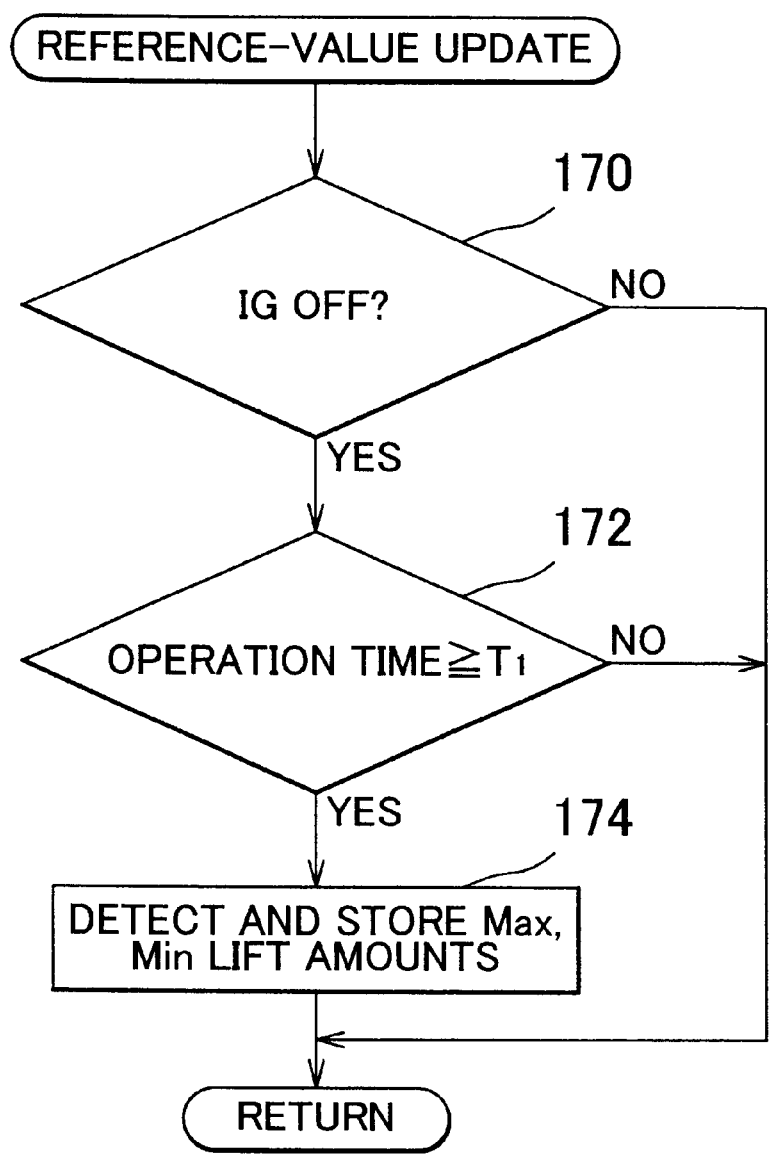
FIG. 7 is a flowchart of a reference-value update routine which is executed in the first embodiment.

FIG. 7 is a flowchart of a reference-value update routine which is executed by the ECU 50 in order to record the above mentioned reference values. It should be noted that, like the routine of FIG. 4 and the routine of FIG. 6, this routine is independently executed for each electromagnetic valve 38, 42.

In the routine of FIG. 7, it is determined whether or not the IG switch 52 has been turned OFF (step 170).

If it is determined in step 170 that the IG switch 52 has not been turned OFF, this cycle of the routine is immediately terminated. On the other hand, if it is determined in step 170 that the IG switch 52 has been turned OFF, it is then determined whether or not the internal combustion engine 10 has been operated for a predetermined time $T_1$ or more (step 172).

The output of each of the lift sensor 44, 46 mounted to the electromagnetic valves 38, 42 is amplified by an amplifier during signal processing. Accordingly, the output of the lift sensor 44, 46 varies slightly according to the warm-up state of the amplifier. The predetermined time $T_1$ used in step 172 is longer than the time required to complete warming-up of the amplifier. Accordingly, if the condition of step 172 is satisfied, the amplifier is completely warmed up. Therefore, if the condition of step 172 is satisfied, it can be determined that the lift sensors 44, 46 are generating a stable output.

If it is determined that the condition of step 172 is not satisfied, this cycle of the routine is terminated without updating the reference values. On the other hand, if it is determined that the condition of step 172 is satisfied, the maximum value Max and the minimum value Min which are output from the lift sensor 44 or 46 during the all-valve operation are recorded as the reference values for the given electromagnetic valve 38 or 42.

As has been described above, according to the routine of FIG. 7, the maximum value Max and the minimum value Min can be recorded as the reference values for calibration under the condition that the lift sensor 44, 46 mounted to each electromagnetic valve 38, 42 generates a stable output. Therefore, according to the system of this embodiment, calibration of the lift sensors 44, 46 mounted to the electromagnetic valves 38, 42 can be conducted with extremely high accuracy by executing the routine of FIG. 4.

In the first embodiment, the electromagnetic valves 38, 42 in all cylinders are operated according to the principles of two-cycle operation after the IG switch 52 is turned OFF. However, the method for operating the electromagnetic valves 38, 42 is not limited to this. For example, the electromagnetic valves 38, 42 in all cylinders may be operated according to the principles of the four-cycle operation. Alternatively, all of the electromagnetic valves 38, 42 may be operated at random. Alternatively, all of the electromagnetic valves 38, 42 may be operated simultaneously.

In the first embodiment, the reference values used in calibration of the lift sensors 44, 46 are obtained during the all-valve operation after the IG switch 52 is turned OFF. However, the invention is not limited to this. Design values pre-stored in the ECU 50 may be used instead of the reference values.

In the first embodiment, the multi-cycle operation, an example of the valve-stopped operation, is limited to the six-cycle operation. However, the invention is not limited to this. The multi-cycle operation may be any operation, such as eight-cycle operation, as long as four strokes (one cycle) are conducted in more than four strokes.

In the first embodiment, the predetermined time $T_0$ during which the valve-stopped operation is inhibited after the internal combustion engine 10 is started is fixed. However, the invention is not limited to this. The predetermined time $T_0$ may be appropriately determined according to the starting temperature of the internal combustion engine 10. It is desirable that the period during which the valve-stopped operation is to be inhibited, be extended or reduced according to the degree of difficulty in operating the electromagnetic valve 38, 42 which is likely to cause a failure. By determining the predetermined time $T_0$ according to the temperature, the valve-stopped operation can be inhibited for an appropriate period while satisfying the previously mentioned requirement, and the like.

Second Embodiment

Hereinafter, the second embodiment of the invention will be described with reference to FIGS. 8 and 9.

Figure 8:
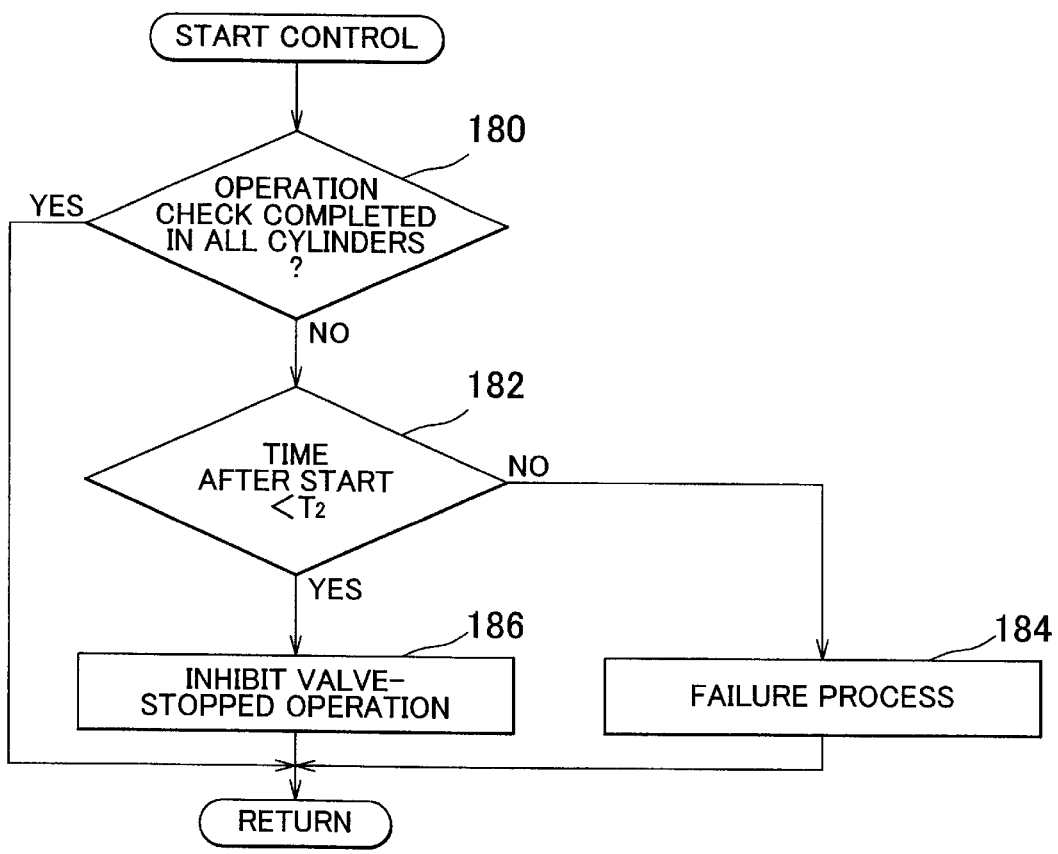
FIG. 8 is a flowchart of a start control routine which is executed in a second embodiment of the invention.
Figure 9:
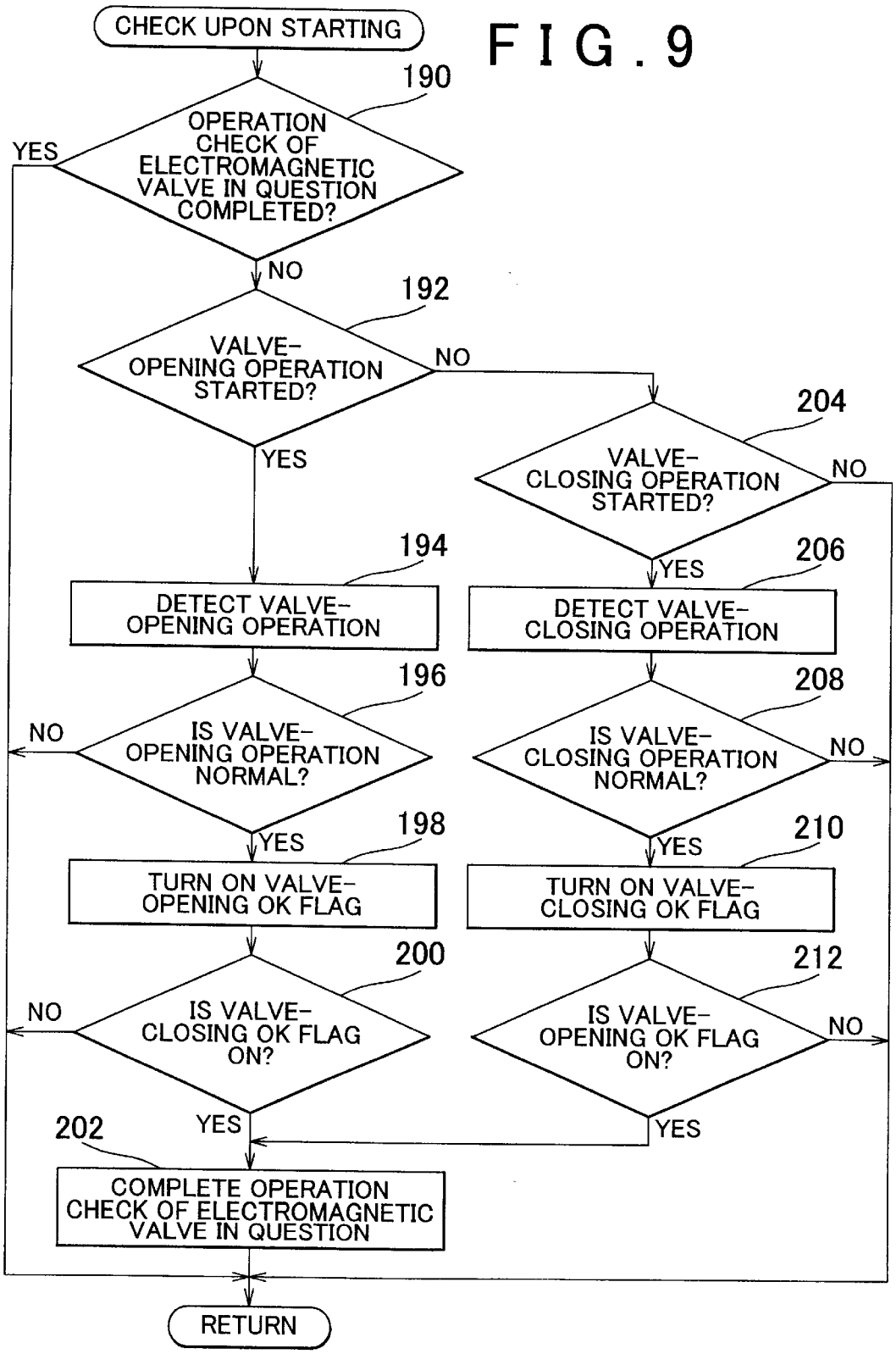
FIG. 9 is a flowchart of a starting check routine which is executed in the second embodiment.

The system of the present embodiment can be realized by causing the ECU 50 to execute the routines of FIGS. 8 and 9 in the system of the first embodiment instead of the routine of FIG. 3.

In the system of the first embodiment, it is assumed that the electromagnetic valve 38, 42 which cannot operate smoothly can be restored to the state where it can operate smoothly if all of the electromagnetic valves 38, 42 are operated for the predetermined time $T_0$ after the internal combustion engine 10 is started. On the other hand, the system of the second embodiment is characterized in that the valve-stopped operation is inhibited until all of the electromagnetic valves 38, 42 actually start operating smoothly.

FIG. 8 is a flowchart of a start control routine which is executed by the ECU 50 in order to inhibit the valve-stopped operation for a desired time after the internal combustion engine 10 is started.

In the routine of FIG. 8, it is determined whether or not the operation check of the electromagnetic valves 38, 42 in all cylinders has been completed (step 180).

As described below, in the system of the present embodiment, it is not determined that the operation check of each electromagnetic valve 38, 42 has been completed until it is confirmed that every electromagnetic valve 38, 42 operates smoothly. Therefore, the condition of step 180 is not satisfied until it is confirmed that all of the electromagnetic valves 38, 42 can operate smoothly. If it has not been confirmed that all of the electromagnetic valves 38, 42 can operate smoothly, it is determined in step 180 that the operation check has not been completed in all cylinders.

If the condition of step 180 is satisfied (i.e., all of the electromagnetic valves are in the normal state), this cycle of the routine is immediately terminated. In this case, the valve-stopped operation is then permitted.

On the other hand, if it is determined in step 180 that the operation check has not been completed in all cylinders, it is then determined whether or not the time which has elapsed after starting of the internal combustion engine 10 is shorter than a failure determination time $T_2$ (step 182).

The failure determination time $T_2$ is set to the longest time required for the electromagnetic valve 38, 42 which cannot operate smoothly to be restored to the state where it can operate smoothly. Accordingly, if it is determined in step 182 that the time which has elapsed after starting of the internal combustion engine 10 is equal to or longer than $T_2$, it can be determined that there is a permanent failure which prevents smooth operation of at least one of the electromagnetic valves 38, 42. In this case, a failure process is executed (step 184), and this cycle of the routine is then terminated.

If it is determined in step 182 that the time which has elapsed after starting of the internal combustion engine 10 has not reached $T_2$, it can be determined that it is necessary to wait for the operation characteristics of the electromagnetic valve 38, 42 which cannot operate smoothly to improve. In this case, this cycle of the routine is terminated while inhibiting the valve-stopped operation (step 186).

In principle, according to the routine of FIG. 8, the valve-stopped operation can be inhibited until it is confirmed that all of the electromagnetic valves 38, 42 operate normally after the internal combustion engine 10 is started. The valve-stopped operation is not inhibited if the failure process is executed after the internal combustion engine 10 is started. The valve-stopped operation is permitted as soon as the operation check of all of the electromagnetic valves 38, 42 is completed. Therefore, the system of the present embodiment ensures that the valve-stopped operation is inhibited for an appropriate period after the internal combustion engine 10 is started.

FIG. 9 is a flowchart of a starting check routine which is executed by the ECU 50 upon starting of the internal combustion engine 10 in order to check if each electromagnetic valve 38, 42 can operate smoothly. This routine is independently executed for each electromagnetic valve 38, 42.

In the routine of FIG. 9, it is determined whether or not the operation check of the given electromagnetic valve 38, 42 has been completed (step 190). In other words, it is determined whether or not it has been confirmed that the given electromagnetic valve 38, 42 can operate smoothly.

If it is determined in step 190 that the operation check of this electromagnetic valve 38 or 42 has been completed, this cycle of the routine is immediately terminated. On the other hand, if it is determined in step 190 that the operation check of this electromagnetic valve 38 or 42 has not been completed, it is then determined whether or not this electromagnetic valve 38, 42 has started the valve-opening operation (step 192).

If it is determined in step 192 that this electromagnetic valve 38 or 42 has started the valve-opening operation, the process of detecting the valve-opening operation is conducted (step 194). More specifically, an actual profile from the fully closed position to the fully opened position of the intake valve 36 or the exhaust valve 40 driven by this electromagnetic valve 38 or 42 is determined in step 194.

It is then determined whether or not the valve-opening operation detected in step 194 is within a permissible range in which the valve-opening operation can be regarded as normal operation (step 196). In other words, it is determined whether or not the valve-opening operation detected in step 194 is normal (smooth).

If it is determined in step 196 that the valve-opening operation of this electromagnetic valve 38 or 42 is not normal, this cycle of the routine is terminated without determining whether or not the operation check of this electromagnetic valve 38 or 42 has been completed. On the other hand, if it is determined in step 196 that the valve-opening operation of this electromagnetic valve 38 or 42 is normal, a valve-opening OK flag is turned ON in order to indicate that the valve-opening operation of this electromagnetic valve 38 or 42 is normal (step 198).

In the routine of FIG. 9, it is then determined whether or not a valve-closing OK flag is ON (step 200).

As described below, the valve-closing OK flag is a flag which is turned ON if it is determined that the valve-closing operation of the given electromagnetic valve 38 or 42 is normal. Accordingly, if it is determined in step 200 that the valve-closing OK flag is ON, it can be determined that both the valve-opening operation and the valve-closing operation of this electromagnetic valve 38 or 42 are normal. In this case, a flag for indicating that the operation check of the given electromagnetic valve 38 or 42 has been completed is set (step 202), and this cycle of the routine is then terminated.

On the other hand, if it is determined in step 200 that the valve-closing OK flag is OFF, step 202 is skipped, and this cycle of the routine is terminated without conducting the process of setting the flag for indicating that the operation check of the given electromagnetic valve 38 or 42 has been completed.

In the routine shown in FIG. 9, if it is determined in step 192 that the given electromagnetic valve 38 or 42 has not started the valve-opening operation, it is then determined whether or not this electromagnetic valve 38 or 42 has started the valve-closing operation (step 204).

If it is determined in step 204 that this electromagnetic valve 38 or 42 has started the valve-closing operation, the process of detecting the valve-closing operation is conducted (step 206).

More specifically, an actual profile from the fully opened position to the fully closed position of the intake valve 36 or the exhaust valve 40 driven by this electromagnetic valve 38 or 42 is determined in step 206.

It is then determined whether or not the valve-closing operation detected in step 206 is within a permissible range in which the valve-closing operation can be regarded as normal operation (step 208). In other words, it is determined whether or not the valve-closing operation detected in step 206 is normal (smooth).

If it is determined in step 208 that the valve-closing operation of this electromagnetic valve 38 or 42 is not normal, this cycle of the routine is terminated without determining whether or not the operation check of this electromagnetic valve 38 or 42 has been completed. On the other hand, if it is determined in step 208 that the valve-closing operation of this electromagnetic valve 38 or 42 is normal, a valve-closing OK flag is turned ON in order to indicate that the valve-closing operation of this electromagnetic valve 38 or 42 is normal (step 210).

In the routine of FIG. 9, it is then determined whether or not the valve-opening OK flag is ON (step 212).

As described above, the valve-opening OK flag is a flag which is turned ON if it is determined that valve-opening operation of the given electromagnetic valve 38 or 42 is normal. Accordingly, if it is determined in step 212 that the valve-opening OK flag is ON, it can be determined that both the valve-opening operation and the valve-closing operation of this electromagnetic valve 38 or 42 are normal. In this case, step 202 is conducted in order to indicate that the operation check of the given electromagnetic valve 38 or 42 has been completed.

On the other hand, if it is determined in step 212 that the valve-opening OK flag is OFF, step 202 is skipped, and this cycle of the routine is terminated without conducting the process of setting the flag for indicating that the operation check of the given electromagnetic valve 38 or 42 has been completed.

According to the routine of FIG. 9, it can be determined that the operation check of each electromagnetic valve 38, 42 has been completed as soon as it is determined that both the valve-opening operation and the valve-closing operation of the electromagnetic valve 38, 42 are conducted normally. In step 180 of the routine of FIG. 8, it is necessary to determine whether or not the operation check of all of the electromagnetic valves 38, 42 has been completed. In the system of this embodiment, this requirement can be satisfied by executing the routine of FIG. 9 for all of the electromagnetic valves 38, 42.

What is claimed is:

1. A controller of a plurality of electromagnetic valves each functioning as an intake valve or an exhaust valve of an internal combustion engine, comprising:

a valve control portion that controls the electromagnetic valves in one of a normal operation mode and a valve-stopped operation mode, the normal operation mode being a mode in which all of the electromagnetic valves are controlled in order to implement the four-cycle operation of the internal combustion engine, and the valve-stopped operation mode being a mode in which at least one of the electromagnetic valves can be regarded as being stopped as compared to the normal operation mode, wherein the valve control portion inhibits control in the valve-stopped operation mode for a predetermined period after the internal combustion engine is started.

2. The controller according to claim 1, further comprising:

a temperature detecting portion that detects a temperature of the internal combustion engine; and a predetermined-period setting portion that sets the predetermined period based on the detected temperature.

3. The controller according to claim 1, further comprising:

a lift-amount detecting portion that detects a lift amount of a valve element of each electromagnetic valve; and a calibration portion that conducts calibration of the lift-amount detecting portion for all of the electromagnetic valves during the period in which control in the valve-stopped operation mode is inhibited after the internal combustion engine is started.

4. The controller according to claim 1, further comprising:

a stop-command detecting portion that detects a command to stop the internal combustion engine; and a stopped period driving portion that causes all of the electromagnetic valves to conduct a predetermined operation after the command to stop the internal combustion engine is generated.

5. The controller according to claim 4, further comprising:

a valve-operation learning portion that conducts a learning operation regarding operation of each electromagnetic valve, while each electromagnetic valve conducts the predetermined operation after the command to stop the internal combustion engine is generated.

6. The controller according to claim 5, wherein:

the valve-operation learning portion conducts the learning operation regarding operation of the electromagnetic valve corresponding to a cylinder in which ignition has been completed, while this electromagnetic valve conducts the predetermined operation.

7. The controller according to claim 5, wherein:

the valve-operation learning portion learns a driving current for appropriately operating the electromagnetic valves.

8. The controller according to claim 4, further comprising:

a lift-amount detecting portion that detects a lift amount of a valve element; and an output-characteristic detecting portion that detects output characteristics of the lift-amount detecting portion while each electromagnetic valve conducts the predetermined operation after the command to stop the internal combustion engine is generated.

9. The controller according to claim 4, wherein:

the predetermined operation of each electromagnetic valve is that the electromagnetic valve conducts an opening operation and a closing operation a predetermined number of times.

10. The controller according to claim 1, wherein:

the predetermined period is a period until it can be confirmed that each electromagnetic valve operates normally.

11. A method for controlling a plurality of electromagnetic valves each functioning as an intake valve or an exhaust valve of an internal combustion engine, comprising the steps of:

controlling the electromagnetic valves in one of a normal operation mode and a valve-stopped operation mode, the normal operation mode being a mode in which all of the electromagnetic valves are controlled in order to implement the four-cycle operation of the internal combustion engine, and the valve-stopped operation mode being a mode in which at least one of the electromagnetic valves can be regarded as being stopped as compared to the normal operation mode; and inhibiting control in the valve-stopped operation mode for a predetermined period after the internal combustion engine is started.

12. The method according to claim 11, further comprising the steps of:

detecting a command to stop the internal combustion engine; and causing all of the electromagnetic valves to conduct a predetermined operation after the command to stop the internal combustion engine is generated.

13. The method according to claim 12, wherein:

the predetermined operation of each electromagnetic valve is that the electromagnetic valve conducts an opening operation and a closing operation a predetermined number of times.

14. The method according to claim 11, wherein:

the predetermined period is a period until it can be confirmed that each electromagnetic valve operates normally.

* * * * *